(12) United States Patent
Park et al.

(10) Patent No.: US 10,379,622 B2
(45) Date of Patent: Aug. 13, 2019

(54) MOBILE TERMINAL AND METHOD FOR CONTROLLING THE SAME

(71) Applicant: LG ELECTRONICS INC., Seoul (KR)

(72) Inventors: Hyunji Park, Seoul (KR); Younghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 344 days.

(21) Appl. No.: 15/331,653

(22) Filed: Oct. 21, 2016

(65) Prior Publication Data

US 2017/0160812 A1 Jun. 8, 2017

(30) Foreign Application Priority Data

Dec. 7, 2015 (KR) .................. 10-2015-0173462

(51) Int. Cl.
*G06F 3/01* (2006.01)
*G06F 3/14* (2006.01)
(Continued)

(52) U.S. Cl.
CPC .......... *G06F 3/017* (2013.01); *G02B 27/0093* (2013.01); *G06F 1/163* (2013.01);
(Continued)

(58) Field of Classification Search
CPC .......... G06F 1/163; G06F 21/00; G06F 21/36; G06F 3/012; G06F 3/013; G06F 3/017;
(Continued)

(56) References Cited

U.S. PATENT DOCUMENTS

2010/0269040 A1* 10/2010 Lee .................. G06F 3/04817
715/702
2012/0079110 A1* 3/2012 Brown ............... G06F 21/6281
709/225
(Continued)

FOREIGN PATENT DOCUMENTS

EP 2650755 10/2013
WO 2015081334 6/2015

OTHER PUBLICATIONS

European Patent Office Application Serial No. 16193453.4, Search Report dated Apr. 19, 2017, 9 pages.
(Continued)

*Primary Examiner* — Hong Zhou
(74) *Attorney, Agent, or Firm* — Lee. Hong, Degerman, Kang & Waimey PC

(57) ABSTRACT

Disclosed are a mobile terminal capable of controlling a head mounted display (HMD) and a controlling method thereof. The mobile terminal includes: a sensor; a communication unit capable of communicating with a head mounted display configured to display a virtual reality screen; and a controller capable of: controlling the head mounted display to display the virtual reality screen including first content; and when a preset gesture input corresponding to a user's head or pupil movement is detected via the sensor, controlling the head mounted display to display locked second content on the virtual reality screen while a worn state of the head mounted display is maintained.

19 Claims, 12 Drawing Sheets

(51) Int. Cl.
*G06F 3/0484* (2013.01)
*G06F 1/16* (2006.01)
*G02B 27/00* (2006.01)
*G06F 21/00* (2013.01)
*G06F 21/36* (2013.01)
*G06F 3/0481* (2013.01)
*G02B 27/01* (2006.01)
*H04N 13/344* (2018.01)

(52) U.S. Cl.
CPC .............. *G06F 3/012* (2013.01); *G06F 3/013* (2013.01); *G06F 3/0484* (2013.01); *G06F 3/14* (2013.01); *G06F 21/00* (2013.01); *G06F 21/36* (2013.01); *G02B 2027/0187* (2013.01); *G06F 3/04817* (2013.01); *H04N 13/344* (2018.05)

(58) Field of Classification Search
CPC .... G06F 3/011; G06F 3/04817; G06F 3/0484; G06F 3/14; G06F 21/31; G06F 21/316; H04N 13/00; H04N 13/344; G02B 27/0093; G02B 27/01; G02B 2027/0178; G02B 2027/0187; G02B 27/017
See application file for complete search history.

(56) References Cited

U.S. PATENT DOCUMENTS

| | | |
|---|---|---|
| 2013/0300652 A1 | 11/2013 | Raffle et al. |
| 2014/0126782 A1* | 5/2014 | Takai .................. G06K 9/0061 382/116 |
| 2014/0259152 A1* | 9/2014 | Yun ......................... G06F 21/31 726/18 |
| 2015/0084864 A1 | 3/2015 | Geiss et al. |
| 2015/0153825 A1* | 6/2015 | Lee .................... G02B 27/0172 345/8 |
| 2015/0153922 A1* | 6/2015 | Ballard ................. H04W 76/10 345/156 |
| 2015/0281569 A1 | 10/2015 | Mizuno et al. |
| 2015/0304790 A1* | 10/2015 | Yamashita .............. G06F 21/32 381/303 |
| 2015/0339468 A1 | 11/2015 | Son et al. |
| 2016/0063767 A1* | 3/2016 | Lee ....................... G06T 19/006 345/419 |

OTHER PUBLICATIONS

European Patent Office Application Serial No. 16193453.4, Search Report dated Jul. 21, 2017, 13 pages.

* cited by examiner

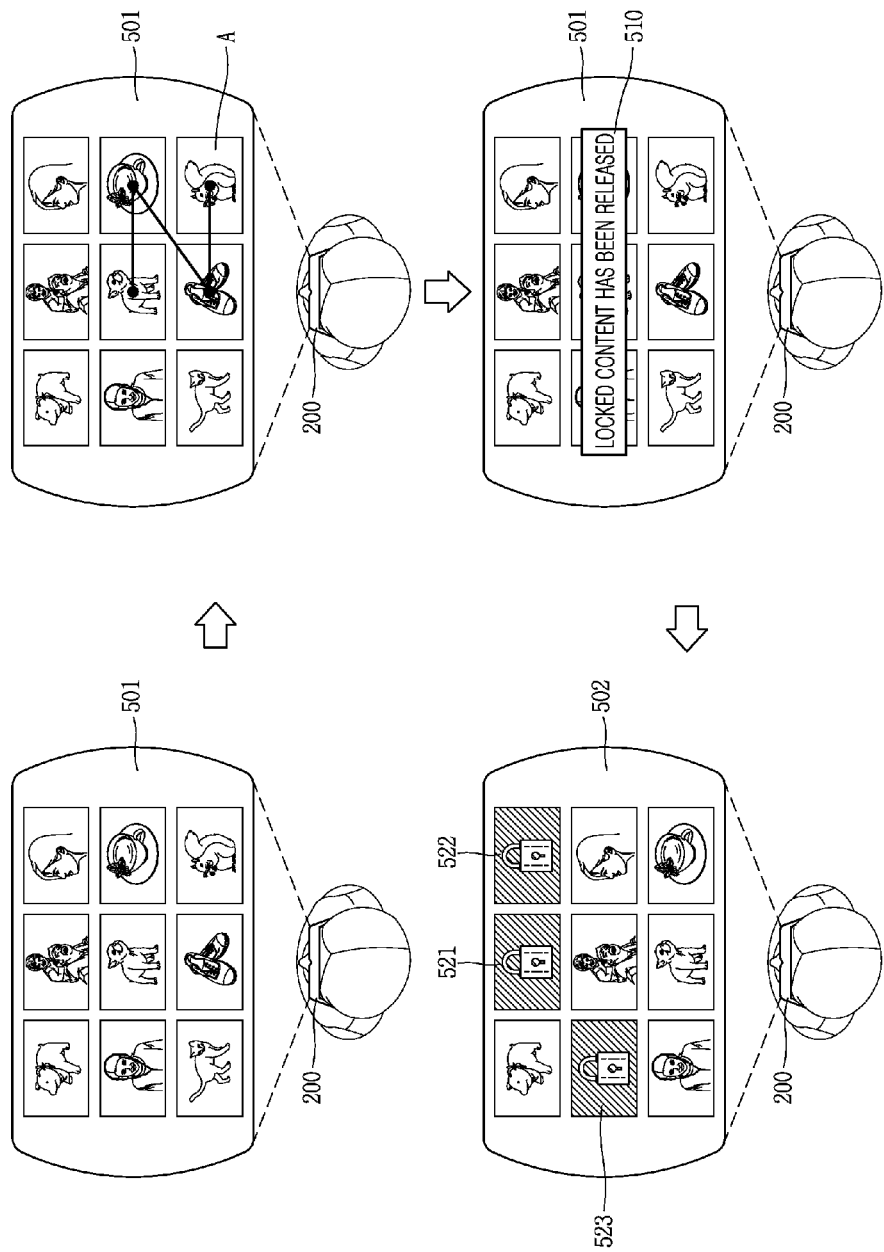

FIG. 10
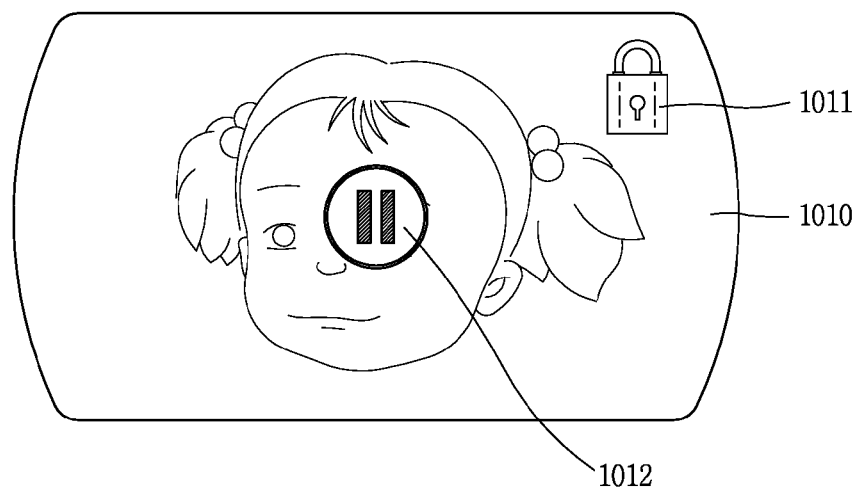

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0173462, filed on Dec. 7, 2015, the contents of which are hereby incorporated by reference herein in its entirety.

BACKGROUND OF THE INVENTION

1. Field of the Invention

The present invention relates to a mobile terminal capable of controlling a head mounted display (HMD), and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Recently, a glass-type mobile terminal which is wearable on a human's body is being developed. The glass-type mobile terminal mounted to a user's head may be a head mounted display (HMD).

The HMD means various types of image display devices for allowing a user to view images (content) by being mounted to a user's head, like glasses. As digital devices become light and small-sized in size, various types of wearable computers are being developed and the HMD is being used widely.

Efforts are ongoing to support and increase the functionality of the mobile terminal and the HMD. Such efforts include software and hardware improvements of the mobile terminal and the HMD, as well as changes and improvements in the structural components of the mobile terminal and the HMD.

SUMMARY OF THE INVENTION

Therefore, an aspect of the detailed description is to provide a mobile terminal capable of controlling a screen which can be output to an HMD, and capable of displaying hidden content by sensing a user's motion, and a method for controlling the same.

Another aspect of the detailed description is to provide a mobile terminal capable of differently controlling a screen when an HMD is detached in a state where hidden content has been output to the HMD, and a method for controlling the same.

To achieve these and other advantages and in accordance with the purpose of this specification, as embodied and broadly described herein, there is provided a mobile terminal, including: a sensor; a communication unit capable of communicating with a head mounted display configured to display a virtual reality screen; and a controller capable of: controlling the head mounted display to display the virtual reality screen including first content; and when a preset gesture input corresponding to a user's head or pupil movement is detected via the sensor, controlling the head mounted display to display locked second content on the virtual reality screen while a worn state of the head mounted display is maintained.

In an embodiment, herein the controller is further capable of: reconfiguring the virtual reality screen based on the first content and the second content when the preset gesture input is detected; and controlling the head mounted display to display, on the second content, an object indicating that the second content is in a locked state.

In an embodiment, wherein the controller is further capable of controlling at least part of the first content to disappear or controlling a corresponding display change to appear when the second content is displayed.

In an embodiment, wherein the second content is displayed on a region differentiated from a region of the first content.

In an embodiment, wherein the controller is further capable of activating the sensor while maintaining the displayed state of the first content and causing the mobile terminal to enter an operation mode for releasing the locked content when a second input is detected while the first content is displayed.

In an embodiment, wherein the controller is further capable of detecting relative coordinates corresponding to the user's head or pupil movement to detect the preset gesture input.

In an embodiment, wherein the controller is further capable of controlling the head mounted display to display: information for guiding a gesture input for releasing the locked content on the virtual reality screen as the mobile terminal enters the operation mode; and a line corresponding to the user's head or pupil movement on the virtual reality screen.

In an embodiment, wherein the second content is related to the first content and is determined according to a type of the first content.

In an embodiment, wherein the controller is further capable of controlling the head mounted display to display: a notification icon indicating a released state of the second content when the preset gesture input is detected; and the second content after the notification icon is displayed.

In an embodiment, wherein the controller is further capable of controlling the head mounted display to display the second content differently based on a detached state of the head mounted display.

In an embodiment, wherein the controller is further capable of: controlling the head mounted display to display the second content when the head mounted display is re-worn within a threshold amount of time and the detached state satisfies a first condition; and changing the second content to a locked state when the detached state satisfies a second condition regardless of whether the head mounted display is re-worn within the threshold amount of time.

In an embodiment, wherein: the first condition corresponds to whether the head mounted display has contacted a ground surface; and the second condition corresponds to a specific positioning of the head mounted display on the ground surface.

In an embodiment, wherein the controller is further capable of controlling the head mounted display to: no longer display the second content on the virtual reality screen when the second content is changed to the locked state; or changing the second content to replacement content when the second content is changed to the locked state.

In an embodiment, wherein the controller is further capable of: changing the second content to a locked state when the head mounted display is disconnected from the mobile terminal; and controlling the head mounted display to display different screens corresponding to the locked state according to an output state of the second content when the head mounted display is disconnected from the mobile terminal.

In an embodiment, wherein the second content disappears from the virtual reality screen when the head mounted display is disconnected from the mobile terminal while the first content and the second content are displayed.

In an embodiment, wherein the second content is changed to replacement content when the head mounted display is disconnected while only the second content is displayed.

In an embodiment, wherein the controller is further capable of changing the second content to a locked state when a threshold length of time elapses after the head mounted display is disconnected while the second content is displayed.

In an embodiment, wherein the controller is further capable of changing the second content to a locked state in response to a first input while the head mounted display is disconnected.

To achieve these and other advantages and in accordance with the purpose of this specification, as embodied and broadly described herein, there is also provided a method of controlling a mobile terminal, the method including: displaying a virtual reality screen on a head mounted display in communication with the mobile terminal, the virtual reality screen including first content; tracking a user's head or pupil movement via a sensor of the head mounted display; and changing at least part of the first content when a preset gesture input is detected in the user's head or pupil movement, and displaying locked second content on the virtual reality screen while a worn state of the head mounted display is maintained.

In an embodiment, the method may further include: detecting that the head mounted display is detached while the second content is displayed; and displaying the second content differently based on a detached state of the head mounted display.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 5 is a conceptual view illustrating a method for displaying locked content on an HMD according to the present invention;

FIGS. 8, 9A, 9B and 10 are views illustrating a method for differently displaying locked content based on a detached state of an HMD, according to the present invention.

DETAILED DESCRIPTION OF THE INVENTION

Figure 1A:
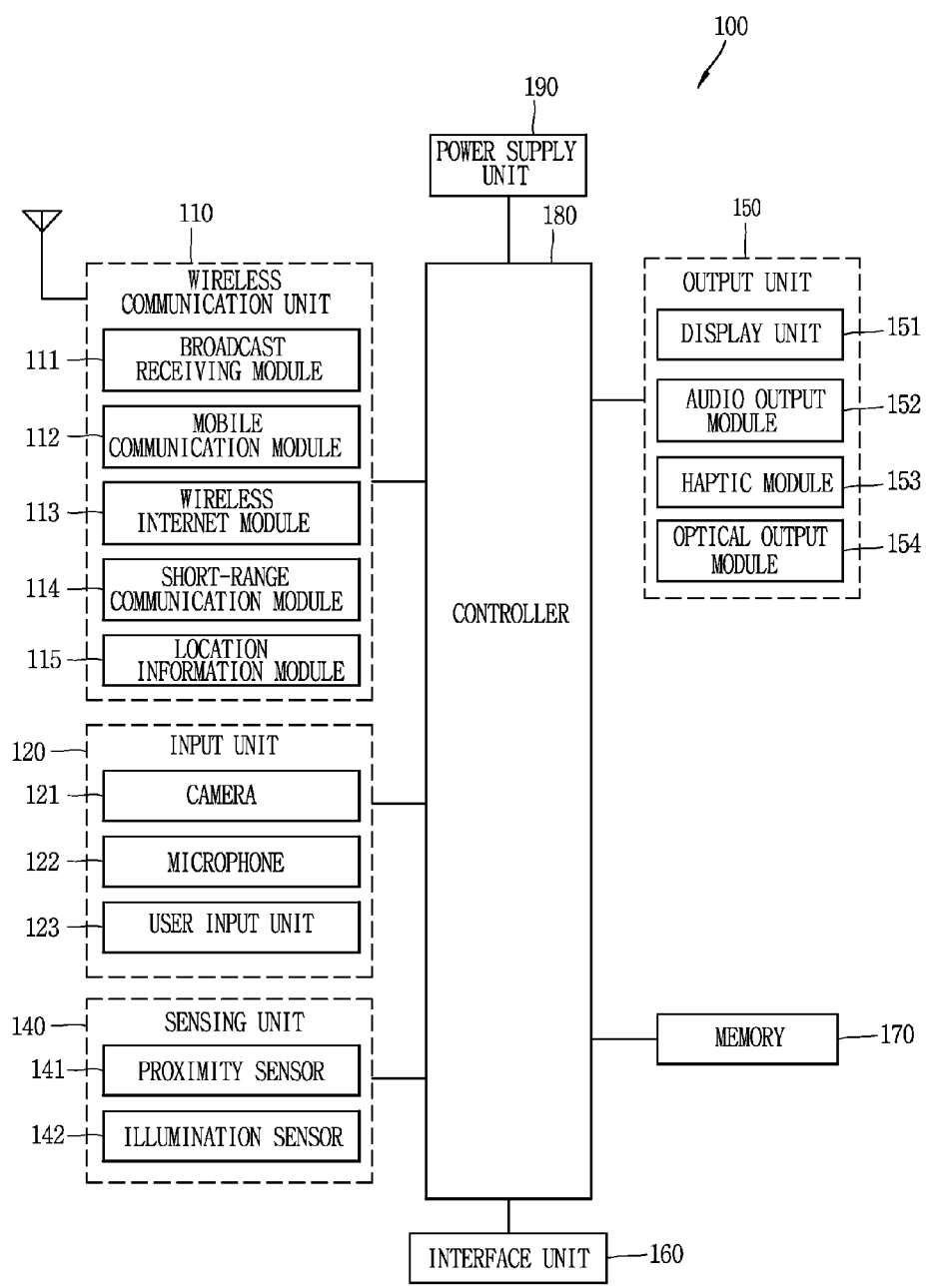
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
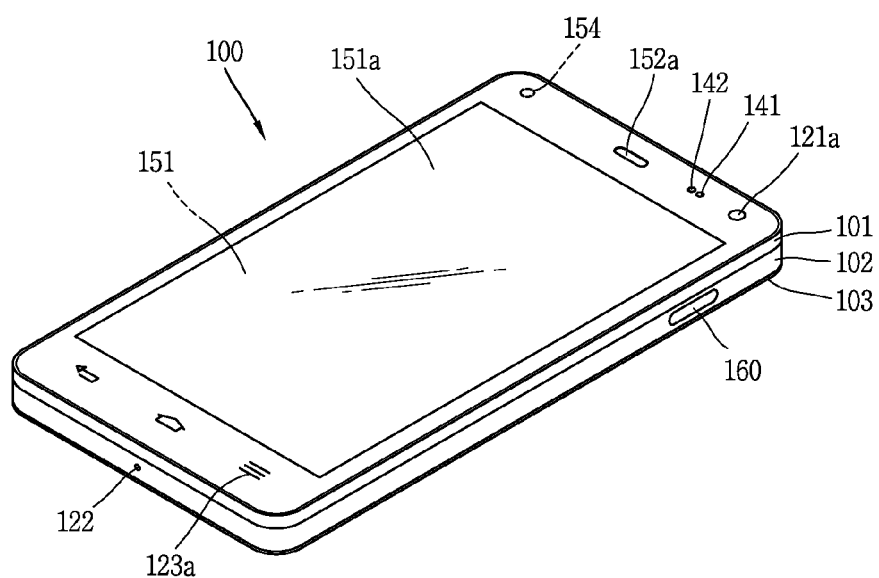
FIGS. 1B and 1C are conceptual views of one example of the mobile terminal, viewed from different directions.
Figure 1C:
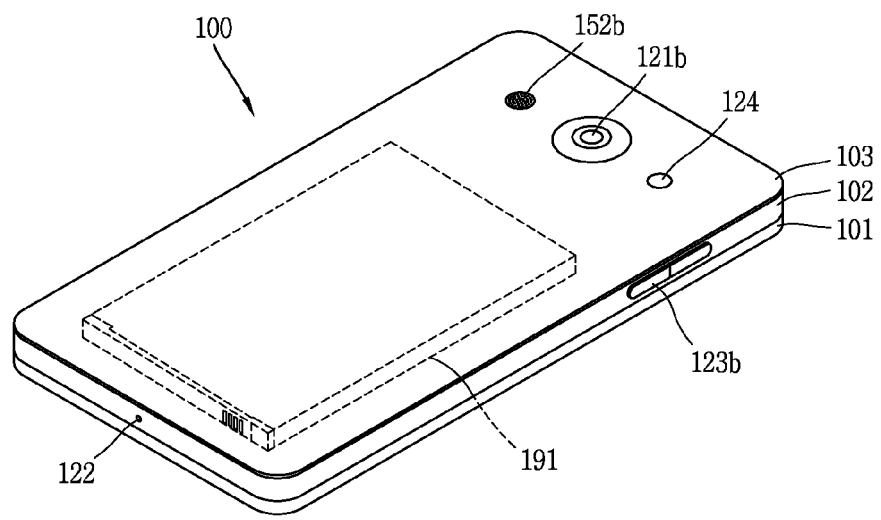

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Hereinafter, a head mounted display (HMD) among wearable devices related to the present invention will be explained in more detail with reference to the attached drawings.

Figure 2A:
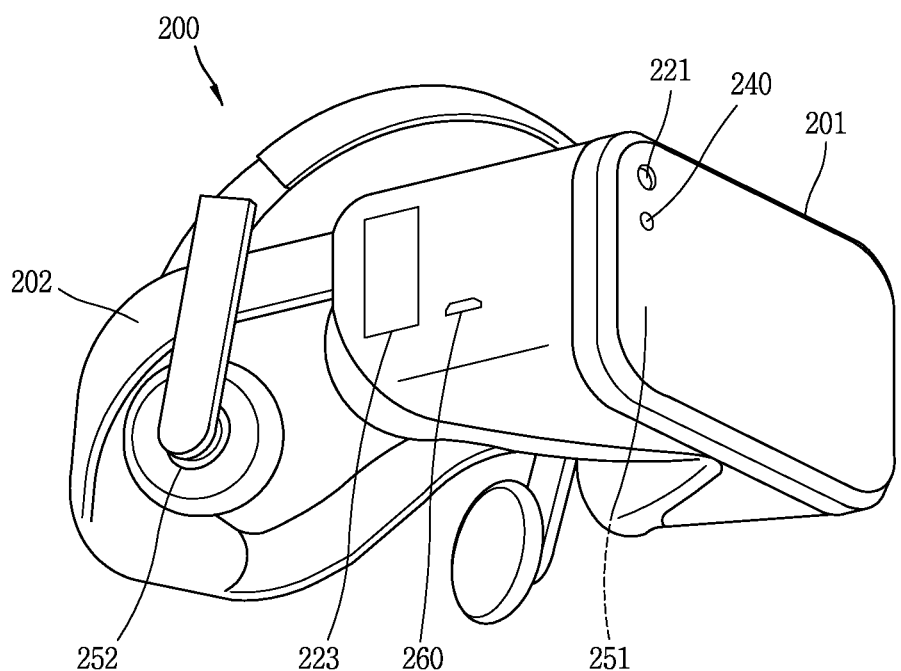
FIGS. 2A and 2B are conceptual views illustrating a head mounted display (HMD) according to the present invention.
Figure 2B:
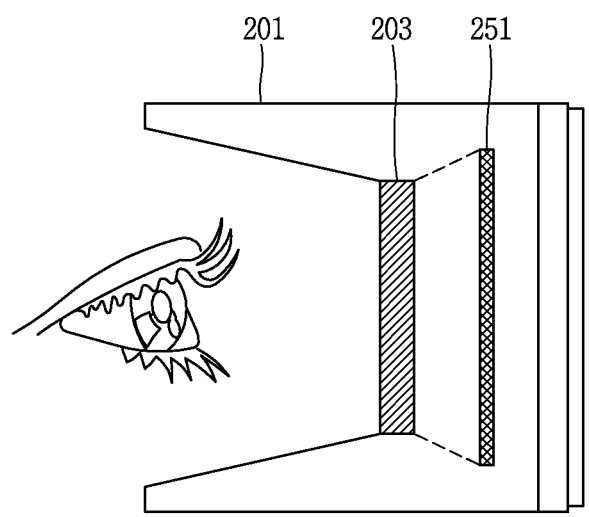

FIGS. 2A and 2B are conceptual views illustrating a head mounted display (HMD) according to the present invention.

An HMD 200 according to the present invention may include at least one of the components aforementioned with reference to FIG. 1A.

For instance, the HMD 200 may include at least one of a wireless communication unit, an input unit (e.g., a user input unit 223, a microphone, etc.) a sensing unit 240, an output unit (e.g., a display unit 251, an audio output unit 252), an interface unit 260, a memory, a controller and a power supply unit. The components shown in FIG. 2A are not necessarily required to implement an HMD. That is, the HMD 200 in this specification may have a larger or smaller number of components than the aforementioned components.

Referring to FIG. 2A, the HMD 200 according to the present invention is formed to be wearable on a user's head (or face), and may include a frame unit (a case, a housing, a cover, etc.). The frame unit may be formed of a flexible material for enhanced wearability. In the drawings, the frame unit includes a first frame 201 and a second frame 202 which are formed of different materials.

For instance, the first frame 201 may provide a space where at least one of the components shown in FIG. 1A is disposed, and the second frame 202 may support (or fix) the first frame 201 such that the first frame 201 may be mounted to a user's head.

The frame unit may be called a body (or an HMD body). The body (or the HMD body) may be understood as a single assembly of the HMD 200. Hereinafter, the HMD body will be explained with a reference numeral 200.

If the frame unit including the first frame 201 and the second frame 202 is regarded as a single HMD body, the HMD body of the present invention may be implemented in various manners. More specifically, the HMD body may include a plurality of surfaces having a predetermined angle therebetween. The plurality of surfaces mean surfaces positioned outside the HMD body. From this point of view, the plurality of surfaces may mean a surface (an external surface, an outer surface, etc.) of the HMD 200. Each of the plurality of surfaces may be flat or curved.

The body (frame unit) is supported on a user's head, and provides a space where various types of components are mounted. As shown, electronic components such as the camera 221, the display unit 251, the user input unit 223, the controller 280, the sensing unit 240 and the interface unit 260, may be mounted to the first frame 201.

Electronic components such as the audio output unit 252 may be mounted to the second frame 202. However, the present invention is not limited to this. That is, the components aforementioned with reference to FIG. 1A, and components required to implement the HMD may be variously arranged at the first frame 201 and the second frame 202, by a user's selection. That is, the HMD 200 according to the present invention may have a larger or smaller number of components than the aforementioned components.

The controller 280 of the HMD 200 is configured to control various types of electronic components provided at the HMD 200. The controller 280 may be understood as the controller 180 aforementioned with reference to FIG. 1A.

As shown in FIG. 2A, the camera 221 may be provided at the HMD body. For instance, the camera 221 may be disposed on one surface (e.g., a front surface) of the HMD body. The camera 221 is disposed close to at least one of a left eye and a right eye, and is configured to capture (input, receive) a front image. Since the camera 221 is disposed close to the eye which is toward a front side, the camera 221 may acquire a scene which a user is viewing as an image.

In the drawings, the camera 221 is provided in one in number. However, the present invention is not limited to this. That is, the camera 221 may be provided in plurality, and may be configured to acquire stereoscopic images.

The HMD 200 may be provided with the sensing unit 240. As aforementioned with reference to FIG. 1A, the sensing unit 240 may alternatively or additionally include other types of sensors or devices, such as a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

For instance, the controller 280 may sense a motion of the HMD 200 using a gyroscope sensor, a gravity sensor, a motion sensor, etc. included in the sensing unit 240. Alternatively, the controller 280 may sense an object which is approaching the HMD body, using a proximity sensor, an illumination sensor, a magnetic sensor, an infrared sensor, an ultrasonic sensor, an optical sensor, etc. included in the sensing unit 240.

The HMD 200 may be provided with the user input unit 223 manipulated to receive a control command. The user input unit 223 may receive any type of input such as a touch input and a push input, if the input is applied in a tactile manner. In the drawings, the user input unit 223 for receiving a push input and a touch input is provided at the frame unit.

A microphone (not shown) for inputting a sound and processing the sound into electrical voice data, and the audio output unit 252 for outputting a sound may be provided at the HMD 200. The audio output unit 252 may be configured to transmit a sound in a general sound output manner or in a bone conduction manner. If the audio output unit 252 is implemented in a bone conduction manner, it is mounted to the head of a user who wears the HMD 200. And the audio output unit 252 mounted to the user's head transmits a sound by vibrating the skull.

As shown in FIG. 2B, the display unit 251 is mounted to the frame unit, and is configured to output screen information (e.g., still images, moving images, etc.) in front of a user's eyes. The display unit 251 may be disposed to correspond to at least one of the left eye and the right eye, such that screen information may be displayed in front of a user's eyes when the user wears the HMD 200. That is, the display unit 251 may be formed to cover (or face) at least one of the left eye and the right eye of a user.

For instance, the display unit 251 of the HMD according to the present invention may be positioned in the HMD body. More specifically, the display unit 251 may be positioned in the HMD, and may be disposed at a position facing a user's eyes when the user wears the HMD.

The HMD 200 may include a lens unit 203 such that a user may view screen information output from the display unit disposed inside the HMD body. That is, the HMD 200 of the present invention may be formed such that screen information (or light) output from the display unit 251 may pass through a user's eyeballs (or a user's range of vision) through the lens unit 203.

For instance, the lens unit 203 may be disposed to correspond to at least one of the left eye and the right eye of a user. Further, the lens unit 203 may be arranged so as to be positioned between a user's eyeballs and the display unit 251 when the user wears the HMD on the head.

The lens unit 203 may be formed to have its position variable under control of a user, because a viewing angle may become different according to a distance between the user's eyeballs and the display unit. And the lens unit 203 may be implemented as a concaved lens, a convex lens, or a combination thereof.

The display unit 251 may project an image to a user's eyes using a prism. In this case, the prism may be formed of a transmissive material such that the user may view both the projected image and a front image.

An image output through the display unit 251 may be viewable in an overlapped manner with a general image. The HMD 200 may provide augmented reality (AR) which allows a user to view a single image by overlapping a virtual image with a real image or background, using such characteristics of the display unit.

That is, the display unit 251 may be formed not to pass external light therethrough for implementation of virtual reality (VR), or may be formed to pass external light therethrough for implementation of augmented reality (AR).

Although not shown, the display unit 251 for covering at least one of a left eye and a right eye may be detachably mounted to the frame unit.

The display unit 251 may be a display unit of an external mobile terminal. The HMD body (frame unit) may be formed such that an external mobile terminal may be detachably mounted thereto, and may be electrically connected to the external mobile terminal. In the case where the HMD body is electrically connected to the external mobile terminal, the controller 280 of the HMD 200 may control the external mobile terminal.

If the external mobile terminal is mounted to the HMD body, the aforementioned components such as the camera 221, the sensing unit 240, the display unit 251 and the controller 280 may be replaced by a camera, a sensing unit, a display unit, and a controller of the external mobile terminal.

For a light weight, the present invention will be explained in an assumption that the HMD 200 is provided with the display unit 251, not that an external mobile terminal is mounted to the HMD body.

Hereinafter, components provided at the HMD body will be explained in more detail.

The wireless communication unit may include one or more modules which permit communications such as wireless communications between the HMD 200 and a wireless communication system, communications between the HMD 200 and another HMD 200, communications between the HMD 200 and a mobile terminal (or a fixed terminal), communications between the HMD 200 and a control device, communications between the HMD 200 and a camera installed outside for a wireless communication, and communications between the HMD 200 and an external server.

Further, the wireless communication unit may include one or more modules which connect the HMD 200 to one or more networks.

The wireless communication unit may include at least one of a broadcast receiving module, a mobile communication module, a wireless Internet module, a short-range communication module, and a location information module. Such modules may be applied in the same or similar manner as or to the wireless communication unit aforementioned with reference to FIG. 1A.

However, the present invention is not limited to this. That is, the mobile terminal 100 and the HMD 200 may transceive (transmit and receive) data with each other through the interface unit 160 of the mobile terminal 100 and the interface unit 260 of the HMD 200.

Figure 3:
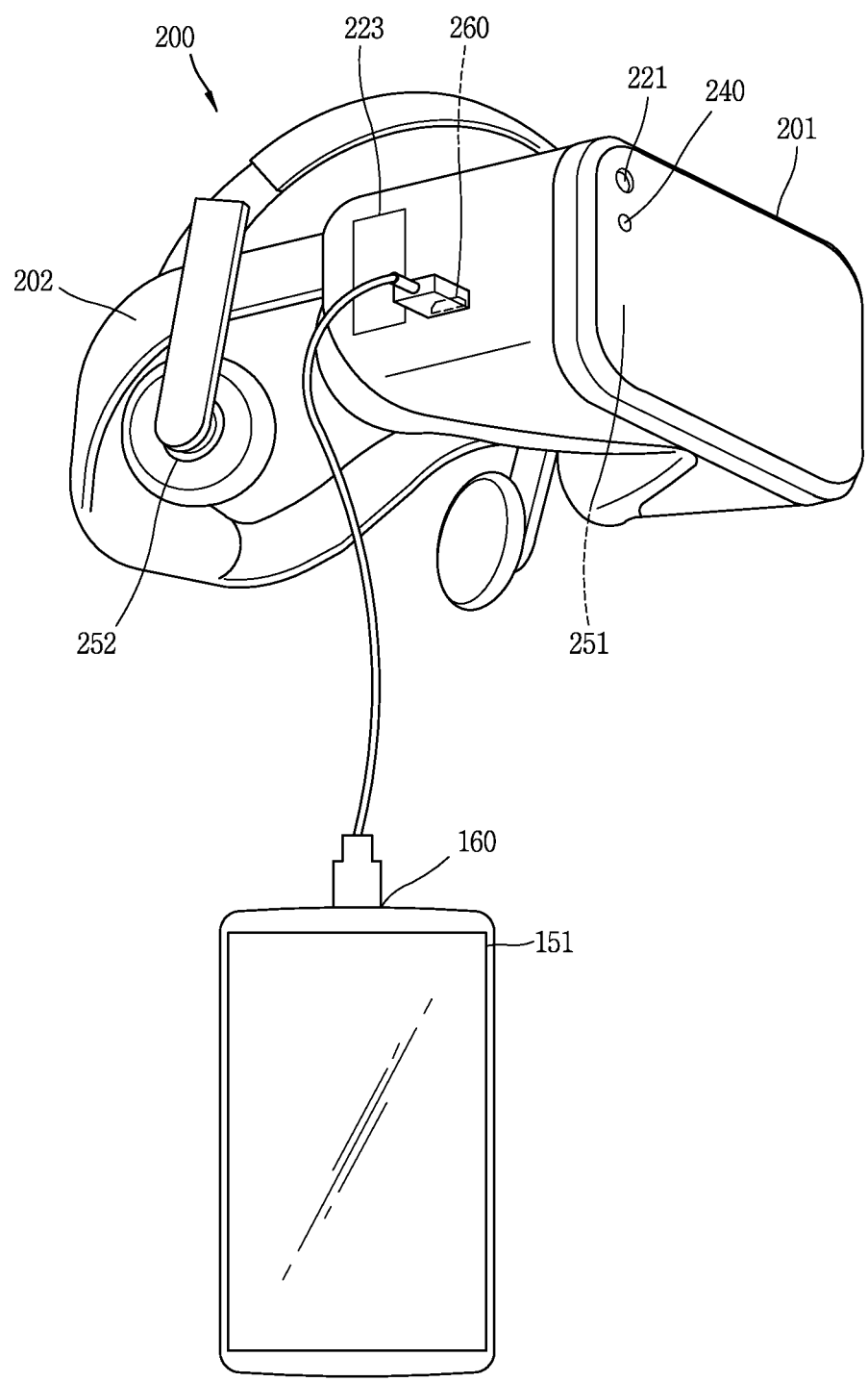
FIG. 3 is a conceptual view illustrating an embodiment where a mobile terminal of the present invention is connected to an HMD for communication.

FIG. 3 is a conceptual view illustrating an embodiment where the mobile terminal of the present invention is connected to the HMD for wired communication.

Referring to FIG. 3, the HMD 200 may be provided with the interface unit 260. The interface unit 260 may be provided at the first frame 201 of the HMD body, for instance.

The interface unit 260 of the HMD 200 serves as an interface for external devices to be connected with the HMD 200. For example, the interface unit 260 can receive data transmitted from an external device (the mobile terminal 100), receive power to transfer to elements and components within the HMD 200, or transmit internal data of the HMD 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, or the like.

As shown in FIG. 3, the interface unit 260 of the HMD 200 may be connected to the interface unit 160 of the mobile terminal for communication through a wired cable. For instance, each of the interface unit 260 of the HMD 200 and the interface unit 160 of the mobile terminal may be a wired data port. The interface units 160, 260 may have the same type of ports or different types of ports.

The HMD 200 connected to the mobile terminal 100 in a wired manner may be controlled by the controller 180 of the mobile terminal 100. The controller 280 of the HMD 200 may control the HMD 200, based on data (e.g., a control command) received from the mobile terminal 100 through a wired cable.

In this specification, it is assumed that the HMD 200 is controlled by the controller 180 of the mobile terminal 100 connected to the HMD 200 in a wired manner, for convenience. However, it is obvious to those skilled in the art that operations to be executed by the controller 180 of the mobile terminal are also executable by the controller 280 of the HMD 200.

The mobile terminal 100 connected to the HMD 200 in a wired/wireless manner for data transception serves as a controller (a control device or a control means) for controlling the HMD 200.

Figure 4:
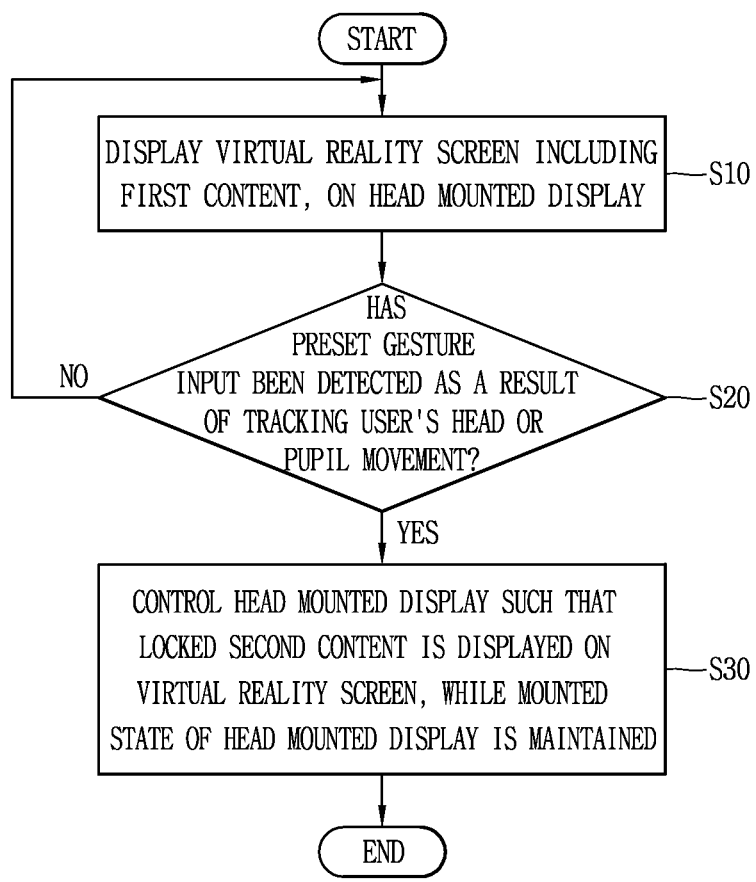
FIG. 4 is a flowchart illustrating a representative control method according to the present invention.

The mobile terminal 100 for controlling the HMD 200 according to the present invention may detect a preset specific gesture by tracking a user's head or pupil movement, through a sensor of the HMD 200. Once the specific gesture is detected, the mobile terminal 100 may release locked content (unlock content) to display the unlocked content on the HMD 200. With such a configuration, pre-stored private content may be output to the HMD 200 by a specific motion, and a user may view the content without exposing the content to the outside. FIG. 4 is a flowchart illustrating a representative control method according to the present invention.

Referring to FIG. 4, the mobile terminal 100 may perform a control by communicating with the HMD 200 which displays a virtual reality screen. More specifically, the HMD 200 may be controlled by the mobile terminal 100 connected thereto for wired/wireless communication. For this, a cursor may be displayed on the display unit 251 of the HMD 200. As the cursor moves on the display unit 251 of the HMD 200 based on a user's request (e.g., an input applied to the user input unit 223 of the HMD 200 or applied to the touch screen 151 of the mobile terminal 100, and information about a motion of the mobile terminal 100 and/or the HMD 200), various functions may be selected to be executed.

In a case where the controller 280 of the HMD 200 is operated independently from the controller 180 of the mobile terminal 100, an input signal corresponding to a touch input applied to the touch screen 151 of the mobile terminal 100 may be transmitted to the HMD 200 through the interfaces 160, 260. In this case, the controller 280 of the HMD 200, having received the input signal, may process the input signal and may output a corresponding screen change to the display unit 251.

As the HMD 200 and the mobile terminal 100 are connected to each other, the controller 180 of the mobile terminal 100 (or the controller 280 of the HMD 200) may display a virtual reality screen including first content, on the HMD 200 (S10). The virtual reality screen means a 3D image formed in a reality space. More specifically, the virtual reality screen may mean a 3D image formed in all directions (e.g., 360°), based on a user who has worn the HMD 200. Alternatively, the virtual reality screen may mean a stereoscopic space image (a stereoscopic image or a 3D image) rendered with a reality space, such that a user who has worn the HMD 200 may recognize that he or she is positioned in a specific space (or a virtual space).

The first content may include all types of screen information which can be output from the mobile terminal 100 or the HMD 200.

For instance, the first content may include part of a virtual reality screen, an execution screen of a specific application, moving images (videos), still images, etc. Alternatively, the first content may be screen information output to the display unit 251 of the HMD 200 as a default, e.g., an initial screen, a home screen, a lock screen, or screen information output when an operation is terminated as the HMD 200 is detached or turned off.

In a state where the first content has been displayed on the display unit 251 of the HMD 200, the controller 180 of the mobile terminal 100 (or the controller 280 of the HMD 200) may detect a preset gesture input, by tracking a user's head movement or a user's eyeline by the sensor through the sensor of the HMD 200 (e.g., the sensing unit 240, the gyro sensor, the acceleration sensor, etc.) (S20).

The sensor for tracking a user's head movement or a user's eyeline may be automatically activated when a worn state of the HMD 200 is detected.

The activated sensor may be converted into a deactivated state for saving of the battery, if a user's head movement has not been sensed for a predetermined time, or if a detached state of the HMD 200 is sensed.

The user's head movement includes a movement, a rotation or a combination thereof. The controller 180 of the mobile terminal 100 (or the controller 280 of the HMD 200) may detect various head movements, based on a moving degree of a user's head, a moving direction, a rotation angle, a moving pattern, etc.

The user's eyeline includes a movement of a user's pupils in a fixed state of the head of the user who has worn the HMD 200, e.g., fixation/movement of an eyeline, an eye motion (pupils' blinking), etc. The controller 180 of the mobile terminal 100 (or the controller 280 of the HMD 200) may extract relative coordinates (first point) corresponding to a fixed position of a user's pupils for a predetermined time, and may extract relative coordinates (second point) corresponding to a moved position of the user's pupils based on the relative coordinates. Then, the controller 180 of the mobile terminal 100 (or the controller 280 of the HMD 200) may connect the relative coordinates to each other, thereby tracking an eyeline of the user. That is, the controller 180 of the mobile terminal 100 (or the controller 280 of the HMD 200) may determine whether a shape of connection between the first and second points corresponds to a pre-registered gesture input. In this case, a user may execute the pre-registered gesture input at any point on the display unit 251.

For instance, the controller 180 of the mobile terminal 100 (or the controller 280 of the HMD 200) may track only one of a user's head movement and a user's eyeline, based on a firstly-sensed movement therebetween. As another example, in a case where a user's head movement or a user's eyeline can be tracked through the sensors of the HMD 200, the controller 180 of the mobile terminal 100 (or the controller 280 of the HMD 200) may track the user's head movement or the user's eyeline using the sensors, and may determine whether one of the user's head movement and the user's eyeline satisfies a preset gesture input.

For instance, the HMD 200 may capture eyes of a user who has worn the HMD 200 using a camera provided in the first frame 201, and may transmit the captured image to the controller 180 of the mobile terminal 100 (or the controller 280 of the HMD 200). Then, the controller 180 of the mobile terminal 100 (or the controller 280 of the HMD 200) may analyze the captured image using an image analysis algorithm, etc., and may determine whether the analyzed captured image corresponds to a preset gesture input.

The preset gesture input is a specific pattern of head movement or pupil movement pre-registered by a user who has worn the HMD 200, and is used to release a locked state of specific content.

For instance, if a head movement or a pupil movement of a user who has worn the HMD 200 forms a specific shape or a specific pattern such as movement or rotation, the controller 180 of the mobile terminal 100 (or the controller 280 of the HMD 200) may determine whether a preset gesture has been input or not, by comparing the detected pattern with a pre-registered pattern.

For the determination whether a head movement or a pupil movement of a user who has worn the HMD 200 forms a specific shape or a specific pattern such as movement or rotation, the controller 280 may recognize relative coordinates of a starting point, and then may determine whether a specific pattern based on the recognized relative coordinates matches a pre-registered pattern. That is, the controller 180 may recognize a preset gesture input, only if a pattern is formed based on relative coordinates, regardless of a position of a starting point on the display unit 251 where a user's head movement or a user's pupil movement for inputting a pattern (a specific shape, a movement, a rotation, etc) starts. For distinguishment of a user's natural head or pupil movement due to a worn state of the HMD 200 from an intentional gesture input, a user's additional input for triggering a tracking function may be required. For instance, if an input signal is detected based on a predefined initial motion or by the user input unit 223 of the HMD 200, the touch screen 151 of the mobile terminal 100, etc., the controller may recognize the detected input signal as a trigger signal. And the controller may start to track a user's head or pupil movement for releasing locked content.

In this case, an indication indicating that a user's head movement or a user's eyeline for inputting a pattern corresponds to a specific shape, a movement, a rotation, etc. may be real-time displayed on the first content. The indication displayed on the first content may have a predetermined transparent degree.

While the user's additional input for triggering a tracking function is maintained, an intentional gesture input may be applied. While the user's additional input for triggering a tracking function is maintained, the displayed state of the first content on the display unit 251 of the HMD 200 may be fixed. For instance, if the first content is videos, play of the videos may be temporarily paused while the user's additional input for triggering a tracking function is maintained.

If a preset gesture input is detected as a result of tracking a head or pupil movement of a user who has worn the HMD 200, the controller 180 of the mobile terminal 100 (or the controller 280 of the HMD 200) may unlock the second content to display the unlocked second content on the display unit 251 of the HMD 200, while the worn state of the HMD 200 is continuously maintained (S30).

In this case, the displayed state of the first content output to the display unit 251 of the HMD 200 may be partially or wholly changed. More specifically, the first content may be partially hidden or may be reduced in size, or part of an output region of the first content may be moved or reduced in size. Further, output of the first content may be converted into a deactivated state, or play of the first content may be stopped.

The second content may be preset to be a locked state through a setting application installed at the HMD 200 or the mobile terminal 100, or through a setting menu of a specific application. A detailed example of locking specific content will be explained in more detail with reference to FIGS. 6A and 6B.

In an embodiment, a range of the second content may be limited to a value related to the first content. For instance, if the first content corresponds to execution of a first application, the second content may be limited to locked content of the first application.

When the locked second content is output, notification information indicating a released state of the content may be output through the audio output unit 252 or the display unit 251 of the HMD 200.

When the locked second content is output, an object indicating that the second content is in a locked state (e.g., a lock image) may be displayed such that the second content may be easily distinguished from the first content.

Upon release of the locked state of the second content, various functions executable by the HMD 200, the mobile terminal 100, or a combination thereof may be performed. However, if the released state of the second content is converted into a locked state, a result on executions of the functions may be automatically deleted, or may be changed into a preset replacement image.

For instance, if a lock image (second content) is transmitted to another person's mobile terminal in an executed state of an SNS application and then is converted into a locked state, a replacement image not the second content may be output to a chat screen, or no information may be output to the chat screen.

Since a user generally sets private content to a locked state, the second content output to the display unit 251 is preferably reset to be a locked state when the user takes off the HMD 200.

In some cases, for user's convenience, required is a method of allowing a user to consecutively-view the second content without inputting a pre-registered pattern when re-wearing the HMD 200, or a method of re-locking the second content without taking off the HMD 200.

For instance, the controller 180 of the mobile terminal 100 (or the controller 280 of the HMD 200) may sense a detached state of the HMD 200 from a user's head, in a state where the locked second content has been displayed on the display unit 251 of the HMD 200.

The detached state of the HMD 200 from a user's head may include a case where a user who has worn the HMD 200 executes a motion for detachment, a case where the HMD 200 is completely detached from the user's head, and a case where the HMD 200 is not completely separated from the user's body even if it has been detached from the user's head. The controller 180 of the mobile terminal 100 (or the controller 280 of the HMD 200) may distinguish the cases from each other, and may execute a corresponding control.

A method of sensing a detached state of the HMD 200 may be executed in a similar manner, to the aforementioned method of sensing a worn state of the HMD 200. Thus, detailed explanations thereof will be omitted.

For instance, upon sensing of a user's motion recognized as a detached state of the HMD 200 (e.g., a motion to up-down move the frame unit of the HMD 200 using one or two hands), the controller 180 of the mobile terminal 100 (or the controller 280 of the HMD 200) may temporarily stop the output of the second content. Then, the controller 180 of the mobile terminal 100 (or the controller 280 of the HMD 200) may display, on the display unit 251, guidance information for confirming a detached state of the HMD 200 (e.g., 'Would you take a break for a while?', 'Content will be automatically locked when you take off the HMD', etc.)

The controller 180 of the mobile terminal 100 (or the controller 280 of the HMD 200) may determine whether the HMD 200 has been detached or not, based on a response to the guidance information.

The controller 180 of the mobile terminal 100 (or the controller 280 of the HMD 200) may display the second content differently, based on a detached state of the HMD 200.

The detached state of the HMD 200 may be distinguished according to whether the HMD 200 separated from a user's head has contacted a ground surface or not, and based on a mounted state of the HMD 200 onto a ground surface.

For instance, in a case where the detached HMD 200 is fixed to the user's hand, neck, forehead, etc. without contacting the ground surface, if the user puts the HMD 200 on the ground surface at a specific posture, the second content may not be converted into a locked state. On the other hand, if the HMD 200 contacts the ground surface in a direction recognizable by the gyro sensor provided in the HMD 200, the second content may be converted into a locked state.

In a case where the user re-wears the HMD 200 within a reference time, if the second content is not converted into a locked state, the second content which was being output when the HMD 200 was detached is consecutively output. On the other hand, if the second content is converted into a locked state, the second content is not displayed or a replacement image is displayed, even if the user re-wears the HMD 200 within the reference time.

If a predetermined time lapses after the user has taken off the HMD 200, the controller 180 of the mobile terminal 100 (or the controller 280 of the HMD 200) may determine that the user does not wish to consecutively-view the locked content any longer, and may automatically convert the second content into a locked state.

In this case, the controller 180 of the mobile terminal 100 (or the controller 280 of the HMD 200) may differently set the reference time for converting the second content into a locked state, based on a played degree of the second content or based on an output time.

For instance, in a case where the second content is videos, if the HMD 200 is detached at a first time point after play of the videos, whether to lock the second content or not may be determined based on a first reference time (e.g., 1 minute). On the other hand, if the HMD 200 is detached at a second time point (e.g., 2-3 minutes) after the first time point, whether to lock the second content or not may be determined based on the second reference time.

Upon sensing of an intentional input (e.g., an input to the user input unit 223 of the HMD 200 or the touch screen 151 of the mobile terminal 100, or a predefined locking motion), the displayed second content may be converted into a locked state, regardless of a detached or worn state of the HMD 200.

As aforementioned, in the present invention, upon sensing of a preset gesture input by tracking a head or pupil movement of a user who has worn the HMD 200, hidden secret content may be displayed on the display unit 251 of the HMD 200. Then, if the user takes off the HMD 200, secret content may be consecutively displayed or may be converted into a locked state for hiding, according to an intention of the user determined based on a detached state of the HMD 200 and a re-wearing time of the HMD 200.

FIG. 5 is a conceptual view illustrating a method for displaying locked content (e.g., lock images) on the HMD according to the present invention, in relation to the flowchart of FIG. 4.

The mobile terminal 100 may execute wired/wireless communication with the HMD 200 which displays a virtual reality screen. More specifically, the mobile terminal 100 may be connected to the HMD 200 in a wired manner through the interface units 160, 260, or may be connected to the HMD 200 in wireless manner through the wired communication unit 110 (Zigbee, WiFi, Bluetooth, etc.).

As shown in FIG. 5, a plurality of images 501 may be output to a virtual reality screen output to the display unit 251 of the HMD 200, as the aforementioned first content.

In this state, although not shown, in a condition that a trigger signal for releasing lock images (i.e., the aforementioned second content) has been input, the controller 180 of the mobile terminal 100 (or the controller 280 of the HMD 200) may track a user's head or pupil movement to recognize a specific pattern input on the plurality of images 501.

As the trigger signal is input, the plurality of images 501 may be fixed without being scrolled or screen-converted along the user's head or pupil movement.

As the trigger signal is input, the HMD 200 may activate its sensors for tracking a user's head or pupil movement, and may enter an input mode for releasing locked content (unlocking content), while the displayed state of the first content is maintained.

In the input mode, screen information 501 which was being output to the display unit 251 of the HMD 200 may be fixed without being changed.

The controller 180 may convert at least part of the display unit 251 of the HMD 200 into a deactivated state.

The controller 180 may stop the play of the first content 501, and may output a guidance prompt for inducing a gesture input to unlock content, to a screen. The input mode is differentiated from an operation for releasing a locked state of the HMD 200. That is, if the aforementioned trigger signal is input in a locked state of the HMD 200, a gesture input for releasing locked content may be sensed or an additional selection window may be popped-up, while the locked state of the HMD 200 is maintained. As a result, a user may select whether to release the locked state of the HMD 200 or the locked state of the content.

In order to prevent release of the locked state of the content due to a user's unintentional motion, a selection window may be output once more before the locked content is displayed, for a user's confirmation.

As another example, in the input mode, at least part of the first content which was being output to the display unit 251 of the HMD 200, may move along a user's head or pupil movement. In this case, the controller 180 of the mobile terminal 100 (or the controller 280 of the HMD 200) may enter the input mode, and then may detect a user's motion by detecting relative coordinates corresponding to the user's head or pupil movement. And the controller 180 of the mobile terminal 100 (or the controller 280 of the HMD 200) may determine whether the detected user's motion is a preset gesture input or not. As aforementioned, the user's motion corresponding to the preset gesture input may start from any point on the display unit 251.

As shown in FIG. 5, in the input mode, a line corresponding to a tracking process may be drawn on the plurality of output images 501, such that the user may view his or her head or pupil movement.

The line may be drawn as a marker displayed on the display unit 251 of the HMD 200 moves along the user's head or pupil movement, in the input mode. If the user wishes to delete the drawn line, an input corresponding to the aforementioned trigger signal (i.e., an input corresponding to the trigger signal for entering the input mode) may be executed.

If the drawn line does not match a preset gesture input, guidance information for inducing a re-input may be output. If the matching operation fails more than a predetermined number of times, another type of input (a password input) (e.g., a voice input) may be required, or the locked state of the second content may be maintained.

If a specific pattern (A) drawn in FIG. 5 is determined as a preset gesture input as a result of recognizing a detected motion, a notification icon 510 indicating an unlocked state of the second content may be output. Then, other hidden images (second content) 521, 522, 523 may be displayed on the display unit 251 of the HMD 200.

In this case, if the hidden second content is related to the first content, the controller 180 of the mobile terminal 100 (or the controller 280 of the HMD 200) may re-configure the virtual reality screen which has been output before the preset gesture input is applied, based on the hidden second content.

For instance, as shown in FIG. 5, as the hidden second content is displayed on the display unit 251 of the HMD 200, at least part of the first content may disappear. Alternatively, at least part of the first content may be changed in size or in color, or may be converted into a deactivated state.

As another example, although not shown, the unlocked second content may be displayed on a different region of the display unit 251, from the first content. In this case, as functions executed on one region of the display unit 251 (e.g., image selection, scroll, edition, sending, etc.) are performed without influencing on another region, a multi environment may be provided.

As another example, the unlocked second content may be displayed in an overlapped manner with at least part of the first content. In this case, a predetermined transparent degree may be applied to the second content, and a higher transparent degree may be applied to the first content displayed on a lower layer.

The controller 180 of the mobile terminal 100 (or the controller 280 of the HMD 200) may display, on the second content, objects indicating a locked state of the second content. FIG. 5 illustrates lock images. However, the present invention is not limited to this. For instance, the object may include other image differentiated from the first content, e.g., color, size, edge, etc.

FIG. 5 illustrates that lock images cover content. However, such an illustration is merely for convenience. That is, the lock image may cover part of the content, and may have a predetermined transparent degree. Alternatively, the lock image may be displayed at an edge of a content output region, or may be displayed close to the edge. If a specific image 523 is selected or if a predetermined time lapses, the displayed lock images may disappear.

If the locked second content is released, various functions related to the second content may be activated. For instance, if the second content corresponds to a specific application, a push alarm function, an automatic update function, etc. may be automatically activated.

The locked second content may be limited to be displayed only while a worn state of the HMD 200 is maintained. More specifically, as aforementioned, the second content may be re-converted into a locked state, if a predetermined time lapses after a user has worn the HMD 200, or if it is determined, based on a detached state of the HMD 200, that a user does not wish to temporarily detach the HMD 200. Alternatively, if a preset input is detected while a user wears the HMD 200, the second content may be converted into a locked state by being hidden or by being replaced by other content.

For instance, in a case where the second content is converted into a locked state as a predetermined time lapses after the HMD 200 has been detached, if the HMD 200 is worn again, the second content may disappear or may be converted into a replacement image. Upon detection of a user's head or pupil movement corresponding to a preset gesture input, the locked second content appears again. In this case, for a consecutive viewing, a screen which was stopped when the HMD 200 was detached may be output, or an icon for moving to a time point for a consecutive viewing may be output together.

A type and a range of content to be unlocked or re-locked may become different according to a type of the first content output to the display unit 251 of the HMD 200.

For instance, if the first content output to the display unit 251 of the HMD 200 is a home screen or a lock screen, the second content may be icons of a locked application. If the first content output to the display unit 251 of the HMD 200 is a plurality of images (or a plurality of thumbnail images) in an executed state of a gallery application as shown in FIG. 5, the second content may be specific images locked in the gallery application.

In a case where setting content to a locked state is executed with a plurality of groups or levels, a plurality of preset gesture inputs corresponding to each group or each level may be registered, or only content which belongs to a specific group or a specific level corresponding to a specific gesture input may be unlocked or locked.

Hereinafter, a method of locking content will be explained with reference to FIGS. 6A and 6B.

Figure 6A:
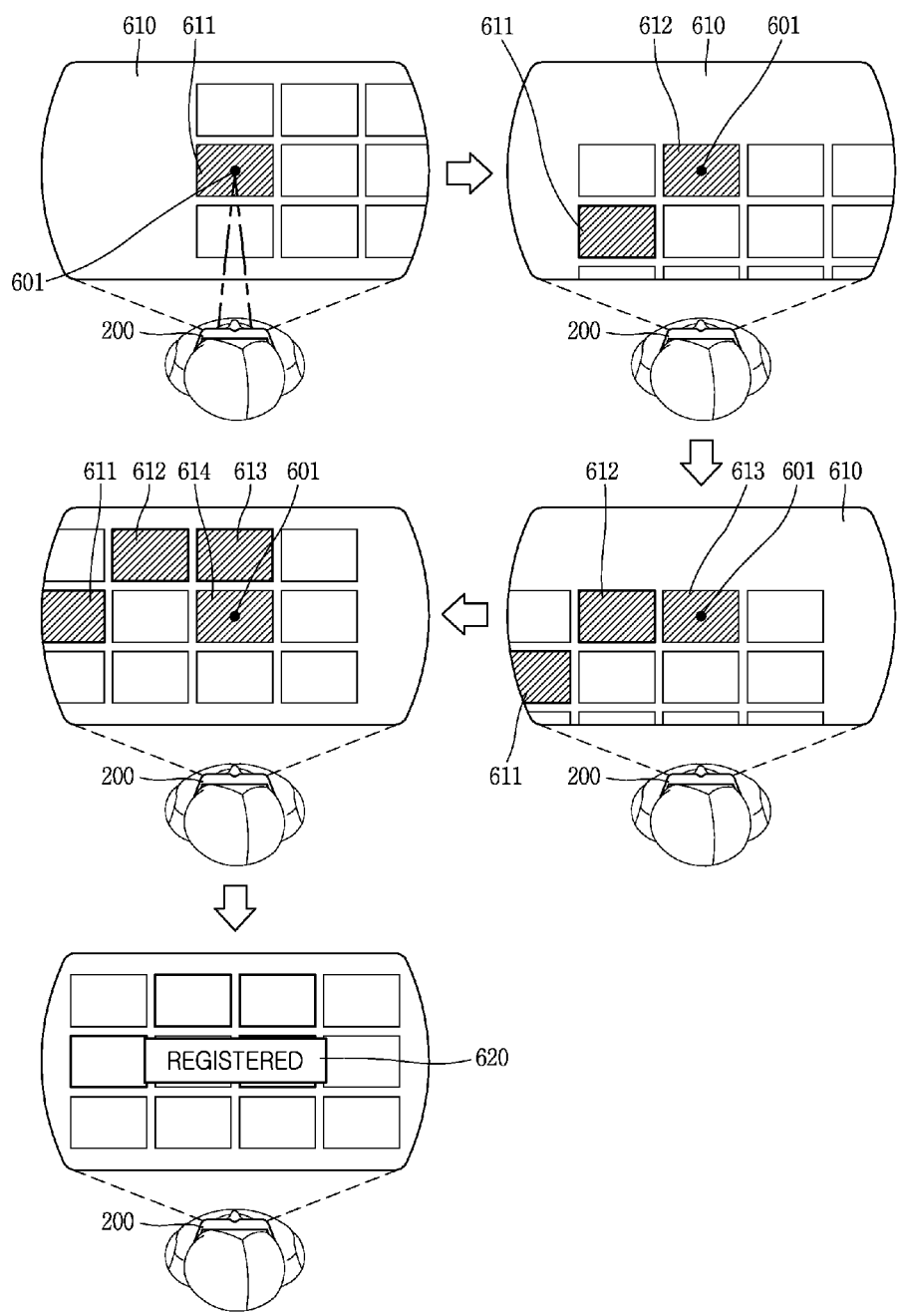
FIGS. 6A and 6B are conceptual views illustrating a method for registering content to be locked according to the present invention.
Figure 6B:
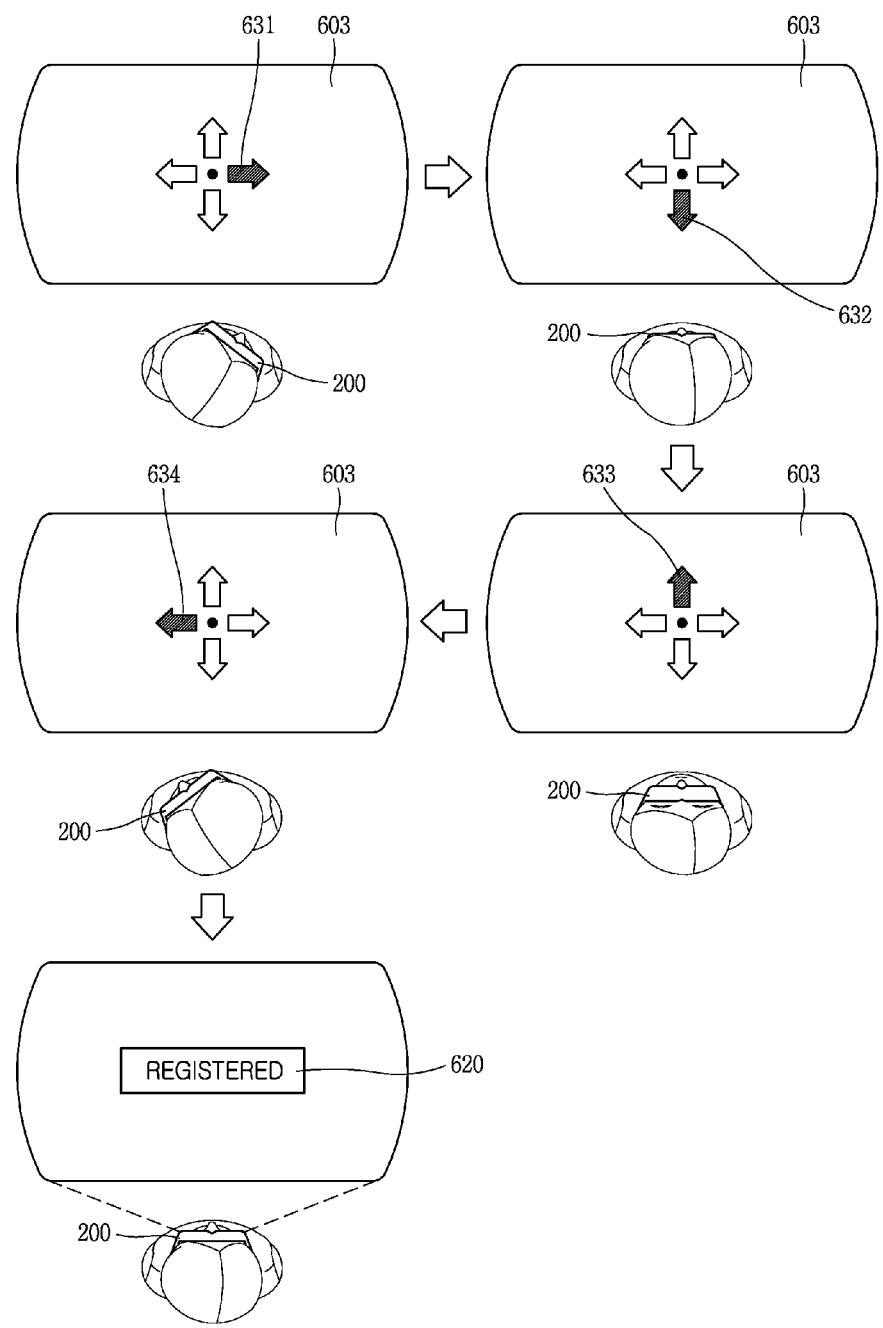

FIG. 6A illustrates an example to register a pattern for setting a locked state based on a pupil movement of a user who has worn the HMD 200, and FIG. 6B illustrates an example to register a pattern for setting a locked state based on a head movement of a user who has worn the HMD 200.

A user who has worn the HMD 200 may pre-register a gesture input for releasing locked content through a setting application. If a content locking menu is selected by a gesture from the setting application, a user may select a gesture registration through a pupil movement (refer to FIG. 6A), or a gesture registration through a head movement (refer to FIG. 6B).

For instance, if a user selects a gesture registration through a pupil movement, an input screen 610 having a grid pattern (e.g., 3*4 grid regions) may be output as shown in FIG. 6A. In this case, a marker which moves along the user's eyeline may be displayed on the input screen 610. Although not shown, information for guiding a user's pupil movement for gesture registration (e.g., 'Please draw a pattern while staring at the quadrangular shape for 2 seconds.') may be displayed on the display unit 251 of the HMD 200.

Next, if the marker is fixed to a first region 611 of the input screen 610 as the user who has worn the HMD 200 fixes his or her eyeline to the first region 611 for a predetermined time (e.g., 2 seconds), a central point of the first region 611 may be defined as a starting point. As a result, the first region 611 is selectively processed (e.g., shaded). Next, if the user's eyeline moves to a second region 612 from the first region 611 and then is fixed to the second region 612 for a predetermined time (e.g., 2 seconds), the marker moves to the second region 612 along the user's eyeline. As a result, a line connected from the starting point to a central point of the second region 612 may be formed. If a third region 613 and a fourth region 614 are sequentially selected in this manner, the gesture registration is completed, and the registered gestured is displayed on the display unit 251 for confirmation by the user. And an icon 620 indicating that a pattern for setting content to a locked state has been registered, is popped-up.

As another example, if the user selects a gesture registration through a head movement, an input screen 603 including a plurality of directional key images may be output to the display unit 251 of the HMD 200 as shown in FIG. 6B. Although not shown, information for guiding a user's head movement for gesture registration (e.g., 'Move your head at least four times, up and down and right and left.') may be output to the display unit 251 of the HMD 200.

As the user who has worn the HMD 200 moves the head up and down and right and left, arrows 631, 632, 633, 634 are sequentially displayed on the directional key images as shown in FIG. 6B. Then, the directional key images are displayed on the display unit 251 in order corresponding to the user's head movement, such that the user may view the registered pattern. Alternatively, an icon 620 indicating that a pattern for setting content to a locked state has been registered, is popped-up.

FIG. 6A illustrates gesture registration through a user's pupil movement. However, the gesture registration may be executed in a more detailed manner, based on the number of times that the eyes blink, an interval of the eye blinking, and various pupil movements obtained by combining the number of times and the interval with an eyeline motion.

FIG. 6B illustrates a gesture registration through a user's head movement in four directions (upper, lower, right and left directions). However, a larger number of directions than the four directions (e.g., 8 directions) may be set, or various head movements including a rotation or a rotation direction of the head and a moved degree of the head toward a specific direction may be implemented. In FIG. 6B, the directional key image is displayed in correspondence to a moved degree of the head.

If a gesture registration is executable in a more detailed manner, the controller 180 may differently set a level of content to be set to a locked state, based on a complexity of the registered gesture. For instance, a different gesture may be registered with respect to each content. In case of specific content, a plurality of gestures may be registered. In this case, the specific content may be output only when a first gesture and a second gesture are sequentially input. If only the first gesture is input, other contents rather than the specific content may be output.

Upon registration of a gesture for setting content to a locked state, a lock-setting may be individually executed through an input while content is being output (e.g., a lock-setting may be selected through a context menu when the content is output). Setting content to a locked state may be executed with respect to an application, or may be executed with respect to a specific object, a specific item and a specific group of a specific application.

Figure 7:
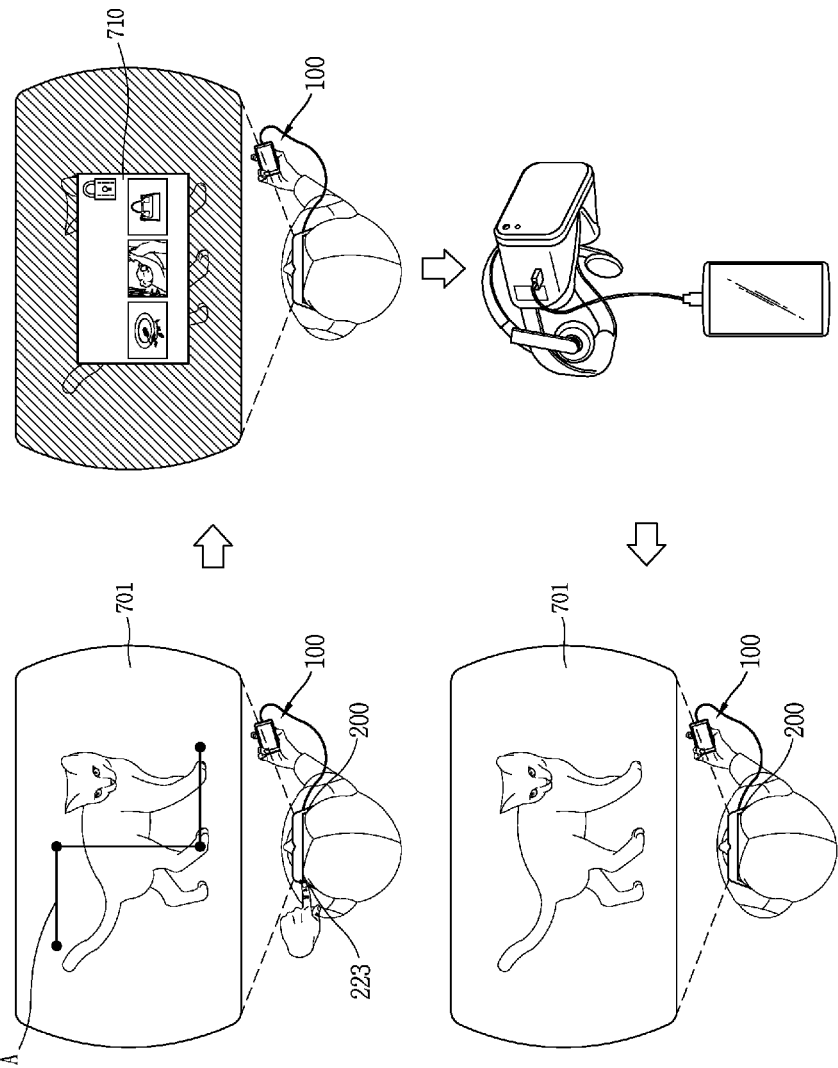
FIG. 7 is a conceptual view illustrating a method for converting content displayed on an HMD to a locked state, according to the present invention.

FIG. 7 is a conceptual view illustrating a method for converting content displayed on the HMD to a locked state, according to an embodiment of the present invention.

As shown in FIG. 7, if a pattern corresponding to a preset gesture input is applied to a specific image 701 in a state where a specific input (e.g., a push input) has been applied to the user input unit 223 of the HMD 200, while a user is viewing the specific image 701 ('first content') through the display unit 251 of the HMD 200, locked content ('second content') may be output to a selection window 710 in the form of a preview.

In this case, while the selection window 710 is output, play of the specific image 701 which was being output to the display unit 251 may be stopped, or the specific image 701 may be converted into a deactivated state. The user may view locked specific content by fixing his or her eyes to one of images output to the selection window 710, for a predetermined time (e.g., 2 seconds).

In this state, if detachment of the HMD 200 is detected, the controller 180 of the mobile terminal 100 (or the controller 280 of the HMD 200) may differently display the locked second content, based on a detached state of the HMD 200, as aforementioned.

As aforementioned, the detached state of the HMD 200 may include a case where the user who has worn the HMD 200 executes a motion for detachment, a case where the HMD 200 is completely detached from the user's head, and a case where the HMD 200 is not completely separated from the user's body even if it has been detached from the user's head. The detached state of the HMD 200 may be sensed by the sensing unit (e.g., camera) of the HMD 200, or through an image analysis of the mobile terminal 100, etc.

If a detached state of the HMD 200 is detected, the controller 180 of the mobile terminal 100 (or the controller 280 of the HMD 200) may determine whether the HMD 200 has contacted a ground surface or not, and may determine whether a user wishes to temporarily detach the HMD 200 based on a contacted state of the HMD 200 onto the ground surface.

More specifically, in a case where the detached HMD 200 is fixed to the user's body without contacting a ground surface, in a case where the HMD 200 has contacted the ground surface with a specific posture, and in a case where the HMD 200 is detached with a first input ('first state'), if a re-worn state (re-mounted state) of the HMD 200 is detected within a predetermined time (e.g., 5 minutes or etc.), a consecutive viewing of the second content may be executed. That is, a screen of the second content, which was being output when the HMD 200 was detached, is consecutively output to the display unit 251.

On the other hand, in a case where the detached HMD 200 has contacted a ground surface, or in a case where the HMD 200 is detached with a second input ('second state'), even if a re-worn state (re-mounted state) of the HMD 200 is detected within a predetermined time (e.g., 5 minutes or etc.), the locked screen of the second content is output to the display unit 251.

In this case, as shown in FIG. 7, the screen 701 (specific image) of the first content which was being output to the display unit 251 when the HMD 200 was detached, or the screen 701 of the first content which was being output before the locked state of the second content is released, may be consecutively output to the display unit 251.

Unlike in FIG. 7, in a case where the HMD 200 is detached in a state where one of the second content has been selected from the selection window 710, if a user re-wears the HMD 200, any image which matches the selected content, not the screen of the first content, is displayed. For instance, if the content selected from the selection window 710 is videos, one of pre-stored replacement videos may be output. And if the content selected from the selection window 710 is a web page, a pre-stored web document or a pre-stored text document may be output.

Hereinafter, a method for differently displaying locked content based on a detached state of an HMD, will be explained with reference to FIGS. 8, 9A, 9B and 10.

Figure 8:
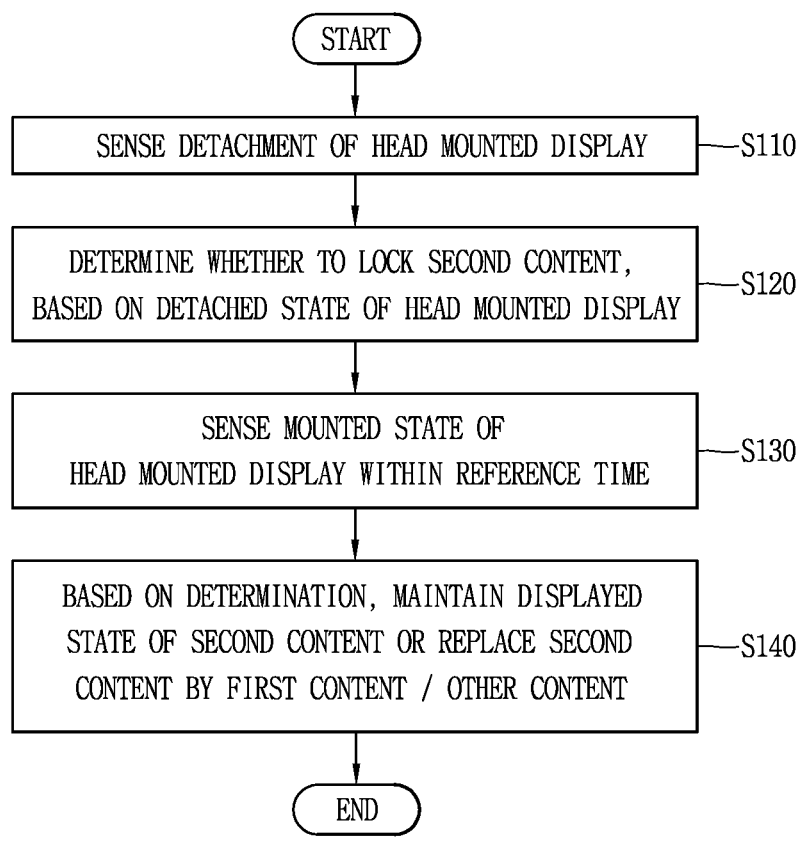

Referring to FIG. 8, the controller 180 of the mobile terminal 100 (or the controller 280 of the HMD 200) may sense a detached state of the HMD 200 from a user's head (S110).

Then, based on the detached state of the HMD 200, it may be determined whether to convert the unlocked second content displayed on the display unit 251 of the HMD 200 (S120). Data for the determination may be stored in the HMD 200 or the mobile terminal 100.

Then, if a worn state of the HMD 200 is sensed within a predetermined time (S130), the second content may be differently displayed based on the determination in S120 (S140).

More specifically, if it is determined that the user has temporarily detached the HMD 200 ('first state'), the second content may be maintained. The second content may be output such that the user may consecutively view the second content from a screen which was being output to the display unit 251 when the HMD 200 was detached.

On the other hand, if it is determined that the user does not want to temporarily detach the HMD 200 or the user wishes to lock the second content ('second state'), the second content may be converted into a locked state. In this state, if the HMD 200 is re-worn on the user's head, screen information to be output may become different according to an attribute of a screen which was being output to the display unit 251 when the HMD 200 was detached.

Figure 9A:
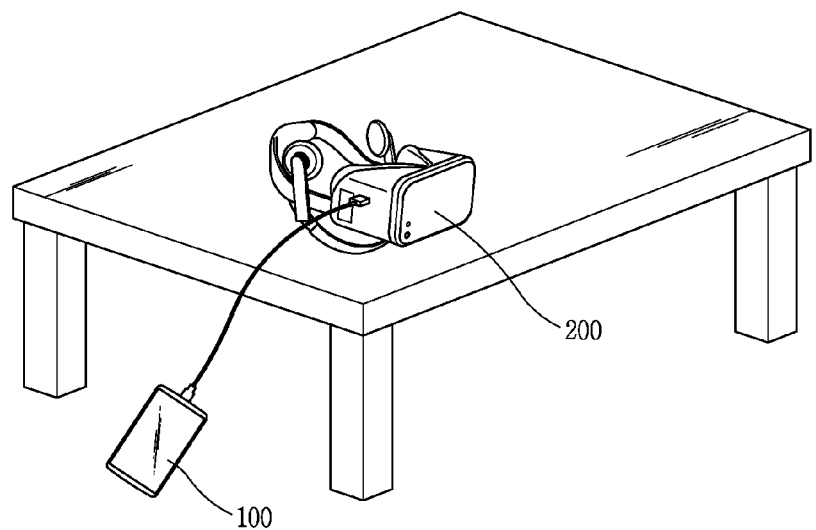

FIGS. 9A and 10 illustrate a screen change on the display unit 251 when a detached state of the HMD 200 is the aforementioned first state.

For instance, as shown in FIG. 9A, if the HMD 200 detached from a user's head is placed on a ground surface with a specific posture where the detached state of the HMD 200 is not sensed by the gyro sensor of the HMD 200 (e.g., a detached posture toward a front side), it may be determined that the user has temporarily detached the HMD 200 (or it may be determined that the HMD 200 is not placed on the ground surface). Here, the detached posture toward a front side means a posture of the detached HMD 200 on a ground surface with the same state as the worn state on the user's head.

Accordingly, the second content may not be converted into a locked state for a predetermined time.

As another example, as shown in FIG. 10, if the HMD 200 detached from a user's head is fixed to another part of the user's body (e.g., the neck, the forehead, the hand, etc.), the displayed state of the unlocked second content on the display unit 251 may be temporarily stopped. Then, if the HMD 200 is re-worn within a predetermined time, a consecutive viewing of an image 1010 may be performed. For instance, if the user stares at a play icon 1012 displayed on the image 1010 for a predetermined time, the image 1010 may be played.

Figure 9B:
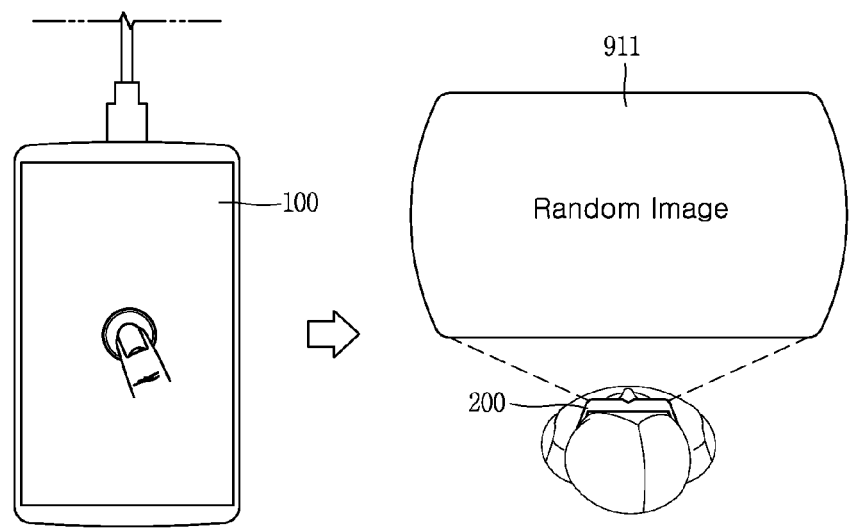

FIG. 9B illustrates a screen change on the display unit 251 when a detached state of the HMD 200 is the aforementioned second state.

More specifically, the screen change corresponding to a locked state is differently processed, according to an output state of the second content at a time point when the HMD 200 is detached.

For instance, as shown in FIG. 9B, if a preset input (e.g., a single touch input or a single push input) is applied to the touch screen 151 of the mobile terminal 100 (or the user input unit 223 of the HMD 200) when the HMD 200 is detached, the second content is converted into a locked state. And any arbitrary image, which matches an output state of the second content at a time point when the HMD 200 is detached, is stored. The any image means replacement content the same as the second content or similar to the second content in type, attribute, etc.

More specifically, if the second content is videos and if the HMD 200 is detached in a state where a single touch input has been applied to the touch screen 151 of the mobile terminal 100 while the second content is played, the second content is converted into a locked state. Then, if the HMD is re-worn, a specific video screen 911 which has not been set to a locked state, is output to the display unit 251 as shown in FIG. 9B.

In this case, if a preset gesture input is detected, the second content may be consecutively viewed from a time point when the play of the second content was stopped. For this, a played degree of the second content, which corresponds to a time point when the HMD 200 is detached, may be recorded in the second content.

In a case where the second content has been output to a virtual reality screen together with the first content, if the HMD 200 is re-worn, only the first content may be output to the virtual reality screen.

As aforementioned, the present invention may have the following advantages.

Firstly, when the HMD 200 is detached from a user's head, lock-released content may be converted into a locked state, for protection of privacy of the user.

Further, in a case where a user who was viewing locked content is absent temporarily or the user has temporarily detached the HMD 200, if the user re-wears the HMD 200, the locked content may be consecutively viewed without a motion of the user. This may enhance user's convenience.

In this specification, it was explained that the HMD 200 is controlled under control of the controller 180 of the mobile terminal 100. However, the present invention is not limited to this. That is, the HMD 200 may be controlled under control of the controller 280. For instance, the controller 280 may execute an operation mode for releasing locked content when a preset input signal is received. Then, the controller 280 may determine whether the preset input signal is a preset gesture input or not, by tracking a head movement or a pupil movement of a user who has worn the HMD 200, using a sensor. Further, the controller 280 may output a plurality of pre-locked content to the display unit 251 of the HMD 200. The controller 280 may determine whether the user wishes to temporarily detach the HMD 200 based on whether the HMD 200 has been detached or not and based on a detached state of the HMD. And based on the determination, the controller 280 may convert the unlocked content into a locked state, or may control a screen to be output to the HMD 200 such that the user may consecutively view the screen when the user re-wears the HMD 200.

The descriptions explained with reference to FIGS. 4 to 10 may be applicable in the same manner or in a similar manner as or to the aforementioned manner.

Various embodiments may be implemented using a machine-readable to medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a sensor;
   a communication unit capable of communicating with a head mounted display configured to display a virtual reality screen; and
   a controller capable of:
   controlling the head mounted display to display the virtual reality screen including first content;
   when a preset gesture input corresponding to a user's head or pupil movement is detected via the sensor, controlling the head mounted display to display locked second content on the virtual reality screen while a worn state of the head mounted display is maintained;
   changing the second content to a locked state when the head mounted display is disconnected from the mobile terminal; and
   controlling the head mounted display to display different screens corresponding to the locked state according to an output state of the second content when the head mounted display is disconnected from the mobile terminal.

2. The mobile terminal of claim 1, wherein the controller is further capable of:
   reconfiguring the virtual reality screen based on the first content and the second content when the preset gesture input is detected; and
   controlling the head mounted display to display, on the second content, an object indicating that the second content is in a locked state.

3. The mobile terminal of claim 2, wherein the controller is further capable of controlling at least part of the first content to disappear or controlling a corresponding display change to appear when the second content is displayed.

4. The mobile terminal of claim 2, wherein the second content is displayed on a region differentiated from a region of the first content.

5. The mobile terminal of claim 1, wherein the controller is further capable of activating the sensor while maintaining the displayed state of the first content and causing the mobile terminal to enter an operation mode for releasing a locked content when a second input is detected while the first content is displayed.

6. The mobile terminal of claim 5, wherein the controller is further capable of detecting relative coordinates corresponding to the user's head or pupil movement to detect the preset gesture input.

7. The mobile terminal of claim 5, wherein the controller is further capable of controlling the head mounted display to display:
   information for guiding a gesture input for releasing the locked content on the virtual reality screen as the mobile terminal enters the operation mode; and
   a line corresponding to the user's head or pupil movement on the virtual reality screen.

8. The mobile terminal of claim 1, wherein the second content is related to the first content and is determined according to a type of the first content.

9. The mobile terminal of claim 1, wherein the controller is further capable of controlling the head mounted display to display:
   a notification icon indicating a released state of the second content when the preset gesture input is detected; and
   the second content after the notification icon is displayed.

10. The mobile terminal of claim 1, wherein the controller is further capable of controlling the head mounted display to display the second content differently based on a detached state of the head mounted display.

11. The mobile terminal of claim 10, wherein the controller is further capable of:
    controlling the head mounted display to display the second content when the head mounted display is re-worn within a threshold amount of time and the detached state satisfies a first condition; and
    changing the second content to a locked state when the detached state satisfies a second condition regardless of whether the head mounted display is re-worn within the threshold amount of time.

12. The mobile terminal of claim 11, wherein:
    the first condition corresponds to whether the head mounted display has contacted a ground surface; and
    the second condition corresponds to a specific positioning of the head mounted display on the ground surface.

13. The mobile terminal of claim 11, wherein the controller is further capable of controlling the head mounted display to:
    no longer display the second content on the virtual reality screen when the second content is changed to the locked state; or
    changing the second content to replacement content when the second content is changed to the locked state.

14. The mobile terminal of claim 1, wherein the second content disappears from the virtual reality screen when the head mounted display is disconnected from the mobile terminal while the first content and the second content are displayed.

15. The mobile terminal of claim 1, wherein the second content is changed to replacement content when the head mounted display is disconnected from the mobile terminal while only the second content is displayed.

16. The mobile terminal of claim 1, wherein the controller is further capable of changing the second content to the locked state when a threshold length of time elapses after the head mounted display is disconnected from the mobile terminal.

17. The mobile terminal of claim 1, wherein the controller is further capable of changing the second content to the locked state in response to a first input when the head mounted display is disconnected from the mobile terminal.

18. A method of controlling a mobile terminal, comprising:
- displaying a virtual reality screen on a head mounted display in communication with the mobile terminal, the virtual reality screen including first content;
- tracking a user's head or pupil movement via a sensor of the head mounted display;
- changing at least part of the first content when a preset gesture input is detected in the user's head or pupil movement;
- displaying locked second content on the virtual reality screen while a worn state of the head mounted display is maintained;
- changing the second content to a locked state when the head mounted display is disconnected from the mobile terminal; and
- controlling the head mounted display to display different screens corresponding to the locked state according to an output state of the second content when the head mounted display is disconnected from the mobile terminal.

19. The method of claim 18, further comprising:
- detecting that the head mounted display is detached while the second content is displayed; and
- displaying the second content differently based on a detached state of the head mounted display.

* * * * *